United States Patent [19]
Schultze et al.

[11] Patent Number: 5,133,577
[45] Date of Patent: Jul. 28, 1992

[54] REFRACTORY PIPELINE WITH GAS-TIGHT JOINT

[75] Inventors: Werner Schultze, Bonn; Stefan Schindler, Rheinbreitbach, both of Fed. Rep. of Germany

[73] Assignee: Vereinigte Aluminium-Werke Aktiengesellschaft, Bonn, Fed. Rep. of Germany

[21] Appl. No.: 553,071

[22] Filed: Jul. 13, 1990

[51] Int. Cl.⁵ ............................................. F16L 49/00
[52] U.S. Cl. ....................... 285/96; 285/187; 285/294; 285/423; 285/911; 222/590; 277/72 R
[58] Field of Search ............... 285/423, 905, 911, 96, 285/106, 10, 11, 294, 41, 95, 187, 190, 98, 93; 222/597, 606, 590, 603, 607, 597; 285/95, 187, 190, 98, 93; 403/31, 34, 35, 37; 277/3, 71, 72, 79

[56] References Cited

U.S. PATENT DOCUMENTS

| Re. 33,036 | 8/1989 | Schiefer et al. | 285/332 |
|---|---|---|---|
| 3,253,307 | 5/1966 | Griffiths et al. | 222/590 |
| 3,320,053 | 5/1967 | Lehman | 222/603 |
| 3,651,825 | 3/1972 | Sury | 277/72 |
| 3,884,511 | 5/1975 | Hermanson | 285/93 |
| 3,944,263 | 3/1976 | Arnold | 285/96 |
| 4,234,216 | 11/1980 | Swanson et al. | 285/93 |
| 4,323,268 | 4/1982 | Wilson | 285/47 |
| 4,360,057 | 11/1982 | Koump | 285/261 |
| 4,412,683 | 11/1983 | Haney et al. | 285/11 |
| 4,429,816 | 2/1984 | Thrower | 222/606 |
| 4,449,738 | 5/1984 | Hotger | 285/11 |
| 4,487,435 | 12/1984 | Yamatani | 285/94 |
| 4,659,601 | 4/1987 | Elliot et al. | 285/47 |
| 4,708,327 | 11/1987 | Waltenspühl | 222/603 |
| 4,904,626 | 2/1990 | Shaffer | 222/606 |
| 4,949,885 | 8/1990 | Struble et al. | 222/603 |

FOREIGN PATENT DOCUMENTS 1536683 12/1978 United Kingdom .

Primary Examiner—Randolph A. Reese
Assistant Examiner—Timothy Aberle
Attorney, Agent, or Firm—Darby & Darby

[57] ABSTRACT

A refractory pipeline having ceramic pipe sections with joints therebetween located at areas where in which there are the greatest temperature differences in the pipeline. Adjacent pipe sections are connected together by shoulders at the ends of each such section, the shoulder of one pipe section being radially outside the shoulder of an adjacent section. A further pipe section is pushed over the joint so as to form a gastight seal by defining a space in communication with a borehole through the one shoulder and a peripheral groove in the other shoulder. A pressure cushion is provided in the space by applying a barrier medium under pressure to the space and thereby through the borehole to the peripheral groove.

20 Claims, 2 Drawing Sheets

REFRACTORY PIPELINE WITH GAS-TIGHT JOINT

BACKGROUND OF THE INVENTION

The invention relates to a refractory pipeline which has several pipe sections that are exposed to nonuniform temperatures.

When a nonuniform distribution of temperature is applied to adjacent sections of ceramic pipelines, heat stresses arise in the pipelines. The stress in the pipe is attributable to sharp differences in the temperatures to which neighboring sections of the same pipe are exposed. The ceramic pipelines generally comprise an alumina material. Such a nonuniform temperature distribution may arise in areas of very steep temperature gradients within the pipe sections of tubular furnaces, tubular digesters, rotary furnaces or similar high temperature heating devices. Such temperature gradients exist, for instance, at the transition between heated zones and cooler regions of typical furnace units. The heat stresses which arise within the pipe can lead to the formation of cracks in the ceramic pipeline or, in extreme cases, to the destruction of the pipeline. The longer the pipeline or the poorer its thermal conductivity, the greater is the likelihood that formation of cracks or pipeline destruction may take place. Additional dangers arise when a furnace unit is operated intermittently, because very steep temperature gradients are created during each commencement of the intermittent operation.

SUMMARY OF THE INVENTION

The present invention is directed at providing a refractory pipeline which avoids the formation of cracks and pipeline destruction that may otherwise take place during the operation of heating devices which distribute heat nonuniformly to a pipeline interconnected with the device. The refractory pipeline of the invention handles nonuniform temperature stresses. Preferably the refractory pipeline of the invention is sealed securely against a highly corrosive environment. The sealing material is effective at operating temperatures in excess of 1,000° C. Preferably, the refractory pipeline of the present invention is rotatable, composed of different materials and requires little maintenance for use in processing environments which contain steep temperature gradients.

By locating the joints between adjacent pipe sections in those regions of the pipeline in which steep temperature gradients are known to occur, it has been found possible to avoid structural cracks (as well as pipeline destruction) that result from the thermal stresses which arise due to large temperature differences in adjacent pipe sections, because the thermal stresses decay at the joints. This is an advantage over continuous pipeline constructions which lack multiple pipe sections and therefore lack areas in which thermal stresses can decay. Even operation of large-scale plants is possible by employing the pipe joint arrangements of the present invention. This pipe joint arrangement avoids the formation of cracks by providing for the decay of thermal stresses.

When the invention is used in conjunction with pipelines that transport toxic or otherwise dangerous fluids, the gaps between pipe sections which necessarily arise must be sealed off. Unfortunately, known sealing materials are not stable at the higher operating temperatures typical for refractory pipelines, especially where contact with a corrosive environment, such as an environment of halogens, is expected at the same time.

Such fluidtight requirements are satisfied by another embodiment of the present invention in which an outer pipe section preferably made of ceramic or metallic material is pushed over the joints. The joint has an outer part, which is an end area of one pipe section, and an inner part, which is an end area of another pipe section that is radially inside of the outer part. Preferably, this further outer pipe section has a longitudinal groove which protrudes over a borehole in the outer part of the joint. Also, the inner part lies radially inside of this borehole with a peripheral groove in communication with the borehole. This peripheral groove extends around the entire circumference of the inner part. A barrier medium comprising a fluid under pressure is applied to the longitudinal groove in the outer part. In this manner, a pressure cushion is formed in the peripheral groove which seals the gap at the joint arising between the inner part and the outer part.

For installations which require rotation of the pipeline, a chamber may be disposed outside of the hot zone. This chamber is stationary relative to the rotational motion and has a conventional sealing system at both sides, e.g., a conventional sliding packing system sealing against the further outer pipe and the next pipe section.

For a better understanding of the present invention, reference is made to the following description and accompanying drawings.

DESCRIPTION OF THE PREFERRED EMBODIMENT

Figure 1:
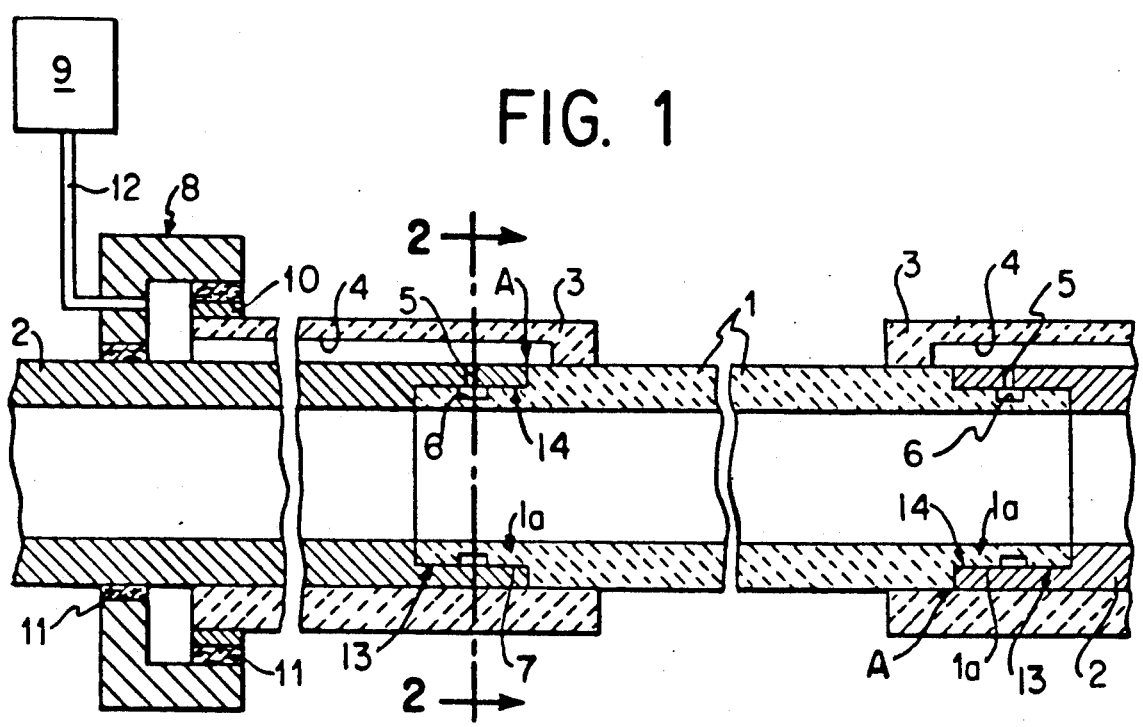
FIG. 1 shows a longitudinal cross-section of a rotatable refractory pipeline in accordance with the invention.
Figure 1A:
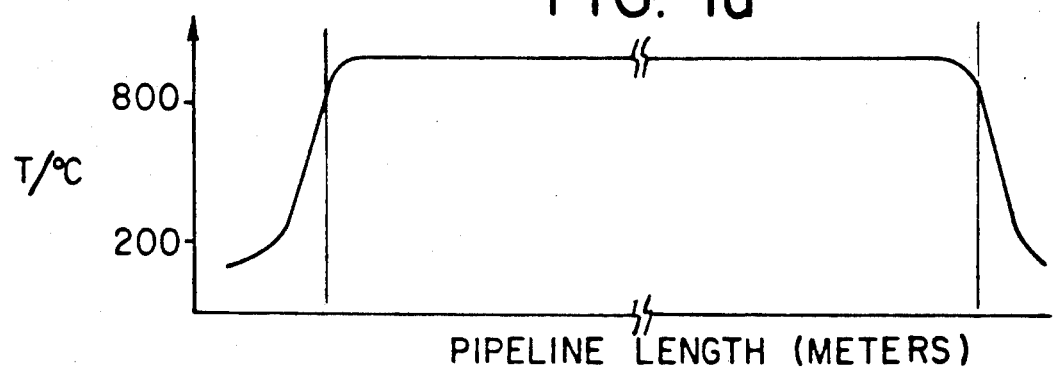
FIG. 1a depicts a characteristic temperature curve associated with the refractory pipeline of the invention.
Figure 2:
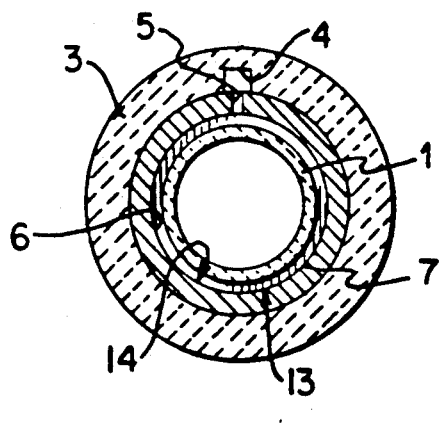
FIG. 2 shows a cross-section at section lines 2—2 of FIG. 1.

FIG. 1 shows a pipe section 1 in a hot pipeline zone exposed to temperatures in excess of 800° C. and which may be made of ceramic oxide material. The pipe section 1 may have shoulders 13 towards the inside at both ends 1a as shown. The shoulders 13 in each case are provided with a peripheral groove 6, which extends about the circumference of the pipe section 1 as may be better seen in FIG. 2. FIG. 1 also shows a pipe section 2 in a cold zone or colder region which is at a lower temperature than the hot zone. This pipe section 2 is preferably made of a metallic material and has a shoulder 14 at one end towards the inside as shown. This shoulder 14 has a borehole 5 which passes through the shoulder. The two pipe sections 1 and 2 are inserted one inside the other so as to provide for a form-fitting connection therebetween at sealing surfaces 7. The borehole 5 opens out directly in communication with the peripheral groove 6.

For gastight applications, pipe section 3 is pushed over joint A in such a manner that a form-fitting connection with pipe section 1 results and a longitudinal groove 4 in pipe section 3 extends over the borehole 5 and the gap between the pipe sections 1 and 2. Preferably, pipe section 3 is made of a ceramic material. About the open end of pipe section 3, a ring 10 is shrunk fit thereon or, after metallization of the ceramic material, soldered. Preferably, the ring 10 is made of a metallic material. Suitable metallic materials for this ring are steel, cast iron or copper. This ring guarantees a tight connection to the barrier medium chamber housing 8.

As shown, the pipe sections 2 and 3 are rotatably mounted to the barrier medium chamber housing 8 by means of a conventional sliding packing system 11. A fluid barrier medium is supplied under slight pressure (slightly above internal pressure in the pipe) to the chamber from a barrier medium source 9 via a pipeline 12. This barrier medium passes over the longitudinal groove 4 and into borehole 5 to groove 6. This barrier medium may be a gas, such as air, nitrogen or a noble gas such as helium or argon. The preferred barrier medium is argon. Normally, the medium selected as the barrier fluid depends on the application to which the pipe is exposed and/or the reaction that is to be conducted in the pipe. The least expensive and most appropriate barrier material for the application is normally selected. A pressure cushion is thereby formed by the barrier medium in groove 6, which effectively seals the joint A in a gastight manner.

Figure 3:
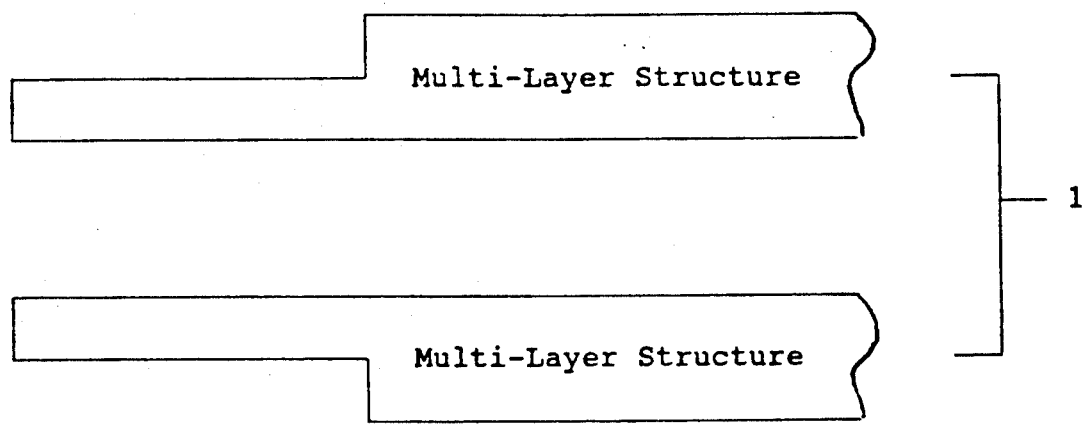
FIG. 3 shows the multi-layer structure of the instant invention.

Preferably, the pipe section 1 is made of a ceramic material and has a pipe diameter of 500 to 2000 millimeters and a wall thickness of 10 to 50 millimeters, with the wall having a multi-layer structure as exemplified in FIG. 3. It is preferred that at least one of the pipe sections 1 and 2 be made of a ceramic material such as ceramic oxide and that the other pipe section 1 or 2 be made of a metallic material. One suitable ceramic oxide material for use in the pipe sections 1 and 2 is alumina. Suitable ceramics also include those based on $Al_2O_3$ including by way of example $Al_2O_3.MgO$, $Al_2O_3.SiO_2$ and $Al_2O_3.TiO_2$, as well as $ZrO_2$ ceramics and ceramic materials based on $ZrO_2$, such as $Zr\ SiO_4$.

It has been found to be advantageous to make ceramic pipe sections by applying the ceramic material onto the exterior of a metal mandrel using the well known plasma spraying technique. This technique is described at length in an article entitled "Plasma Generated Oxide Ceramic Components" by S. Schindler, W. Schultze, in Interceram 37 (1988)[2]39–42. It has also been found to be advantageous to coat the plasma-sprayed pipe section with a coating based on zirconium oxide. In this plasma spraying procedure a high temperature hydrogen oxide plasma is produced using a burner. The plasma reaches a temperature of 15,000° C. in its center and leaves the burner at high speed in the shape of a beam. Ceramic powder is fed into the plasma beam as it is discharged from the burner. The hot plasma beam melts the surface of the powder and propels the powder at high speed onto a metal mandrel. On impact, the powder particles deform, build up a solid interconnected compound and cool down quickly. The metal mandrel is rotated to provide tube shaped components. The finished plasma generated ceramic component and the metal mandrel can be separated from each other relatively easily. The mandrel remains intact and can be used again. A particularly useful embodiment is known as the water stabilized plasma. The ceramic material in the form of a plasma is sprayed onto the tubular mandrel and then shrinks off, by cooling, in a few minutes.

It is further recommended that the ceramic oxide material used in the pipe sections have a thermal conductivity of less than 5 Watts/meter$\times$°Kelvin and a modulus of elasticity of more than 10,000 Newtons/millimeter$^2$.

Although the phrase "pipe sections" has been used, the invention is not intended to be limited to a particular type or class of pipe and may be used with any form of tubular member.

The invention will now be illustrated with reference to the following working Examples:

EXAMPLE I

Construction of a Ceramic Pipe Section

A ceramic pipe section according to the invention is made by cutting a length of ceramic pipe and turning the ends to create shoulders at each end. All of the operations are performed with diamond tools. Holes are drilled in the pipe at the positions illustrated in FIG. 1.

EXAMPLE II

Application to a Chemical Plant

The pipe sections of Example I are installed in the exhaust pipeline from a chemical plant carrying $SiCl_4 + NH_3$. One section of the pipeline is exposed to a maximum temperature of 1000° C.

At a point 1.5 meters away from the maximum temperature point the pipe is exposed to a constant low temperature of 120° C. A barrier gas joint having the configuration illustrated in FIG. 1. is installed between two adjacent pipe sections, i.e., between the low temperature point on the pipe and the high temperature point. The pipe section has the following dimensions and configuration. OD 250 mm, ID 235 mm, length 6,500 mm. One ceramic section according to the invention is installed at 1.25 m and another at 5.25 m measured from one end. A barrier gas (nitrogen) is installed in the joint 6 under a pressure of approximately 100 m/bar. When the plant is operated and $SiCl_4$ and $NH_3$ is passed through the lumen of the pipe, the following observations were made. No oxygen could be detected in the generated $Si_3N_4$ as the reaction of $SiCl_4$ and $NH_3$ occurred in a "closed" system under the protective barrier gas.

The ceramic pipe joints of the present invention may be made from the following ceramic compositions: Alumina, Spinel, Mullite and Zirconia.

The ceramic pipe sections of the invention can withstand temperature swings between about 20° C. and 1800° C. or more without breaking or cracking. The pressurized barrier fluid acts as an expansion joint to take up the expansions and contractions in pipe length.

The high temperature (hot) zones of a pipeline are determined by measuring the temperature of the pipe at predetermined, spaced apart points along the length of the pipe. The ceramic pipe fittings of the present invention are installed in those pipe sections in which the temperature changes by more than 500° C. in a distance of 0.2 meters or less.

The sliding packing system 11 can be made of graphite, copper, teflon, or perbunan rubber, but is preferably made of graphite.

A zirconium oxide coating material may be used to coat the ceramic pipe sections of the invention is composed of predominantly fine $ZrO_2$ powder with about 10% of sodium or potassium silicate. The oxide coating is applied to the pipe using the well known airless spray gun also used for painting cars, etc.) The thickness of the coating is about 0.3 mm to 0.5 mm. The coating acts as a seal and thus improve the gastight nature of the pipe.

While the foregoing description and drawings represent the preferred embodiments of the present invention, it will be understood that various changes and modifications may be made without departing from the spirit and scope of the present invention.

What is claimed is:

1. A refractory pipeline extending through an outside environment, the pipeline comprising:
   means for conveying a fluid medium, said conveying means including a first elongated tubular member having a first end and a second elongated tubular member having a second end, said first and second ends being inserted one into the other to form a joint connection which has a gap between the first and second ends, the first and second tubular members each having a respective elongated inner tubular channel, said tubular channels being in communication with each other for conveying the fluid medium through the tubular channels, the joint connection including a first shoulder member and a second shoulder member, said shoulder members overlapping each other and having an interior facing surface and an exterior facing surface, the first shoulder member extending from said first tubular member, said second shoulder extending from said second tubular member, and the first shoulder member being radially inside the second shoulder member;
   means for sealing said joint connection, said sealing means consisting of a pressurized, gaseous barrier medium which forms a pressure cushion that seals the gap between said first and second ends in a gas-tight manner and thereby seals off and protects the fluid medium within tubular channels from the outside environment, said sealing means including at least one peripheral groove in the first shoulder so that the pressure cushion may form in the peripheral groove, the second shoulder having a hole in fluid communication with said peripheral groove and extending radially outward to the exterior facing surface of said second shoulder, the peripheral groove extending about a circumference of the first shoulder; and
   means for supplying the barrier medium under pressure through said hole to said peripheral groove.

2. A refractory pipeline as set forth in claim 1, wherein one of said first and second tubular members is composed of a metallic material and the other of said first and second tubular members is composed of a ceramic material.

3. A refractory pipeline as in claim 1, wherein said first tubular member has a diameter of 500 to 2000 millimeters and a wall thickness of 10 to 50 millimeters.

4. A refractory pipeline as in claim 3, wherein said first tubular member has a wall with a multi-layer structure.

5. A refractory pipeline as in claim 1, wherein said first tubular member has a thermal conductivity of less than 5 watts/meter × °Kelvin and a modulus of elasticity of more than 10,000 Newtons/mm$^2$.

6. A refractory pipeline as in claim 1, wherein one of said first and second tubular members is composed of a ceramic oxide material.

7. A refractory pipeline as in claim 1, wherein one of said first and second tubular members is composed of a ceramic material.

8. A refractory pipeline as in claim further comprising a zirconium oxide coating on said ceramic material.

9. The refracting pipeline of claim 1, wherein the hole extends from the interior facing surface of the second shoulder to the exterior facing surface of the second shoulder and is arranged such that the hole is opposite an area of the first shoulder where the peripheral groove is located.

10. The refractory pipeline of claim 1, wherein the gaseous barrier medium is an inert gas.

11. A refractory pipeline as in claim 1, comprising a third tubular member disposed on the exterior surface of said first tubular member and defining a space between said third tubular member and said shoulder on said second tubular member, said space being in fluid communication with said hole, and said barrier medium being supplied to said hole via said space.

12. A refractory pipeline as in claim 11, wherein the shoulder extending from said first tubular member has a first portion and a second portion, said peripheral groove being located between said first and second portions, both of said first and second portions having a respective sealing surface against said other shoulder.

13. A refractory pipeline as set forth in claim 11, wherein said third tubular member is elongated and has a groove which extends longitudinally along the axis of said third tubular member, and said groove defining said space.

14. A refractory pipeline as in claim 13, wherein the gas is a member selected from the group consisting of air, nitrogen and a noble gas.

15. A refractory pipeline as set forth in claim 13, wherein said barrier medium is a noble gas.

16. A refractory pipeline as in claim 13, wherein said third tubular member has a closed end mounted on said first tubular member and an open end comprising a ring, said ring being mounted on a circumferential periphery of said open end.

17. A refractory pipeline as in claim 13, further comprising means for supporting said first, second and further tubular members for rotation about their respective longitudinal axis.

18. A refractory pipeline as in claim 17, wherein said supporting means includes a chamber housing which is in fluid communication with said space, said chamber housing being stationary relative to said first, second and further tubular members which are rotatable together.

19. A refractory pipeline as in claim 17, wherein said supporting means includes means for connecting said second tubular member to said chamber housing.

20. A method of using a refractory pipeline, comprising the steps of:
   conveying a fluid medium through first and second elongated tubular members, the first elongated tubular member having a first end, the second elongated tubular member having a second end, the first and second ends being inserted one into the other to form a joint connection which has a gap between the first and second ends, the first and second tubular members each having a respective elongated inner tubular channel, said tubular channels being in communication with each other for conveying the fluid medium through the tubular channels, the joint connection including a first shoulder member and a second shoulder member, said shoulder members overlapping each other and having an interior facing surface and an exterior facing surface, the first shoulder member extending from said first tubular member, said second shoulder extending from said second tubular member, and the first shoulder member being radially inside the second shoulder member;

sealing the joint connection with an element consisting of a pressurized, gaseous barrier medium to form a pressure cushion that seals the gap between the first and second ends in a gastight manner and thereby seals off and protects the fluid medium within the tubular channels from the outside environment, the pressure cushion forming within at least one peripheral groove in the first shoulder, the second shoulder having a hole in fluid communication with said peripheral groove and extending radially outward to the exterior facing surface of said second shoulder, the peripheral groove extending about a circumference of the first shoulder; and supplying the barrier medium under pressure through said hole to said peripheral groove.

* * * * *